UNITED STATES PATENT OFFICE.

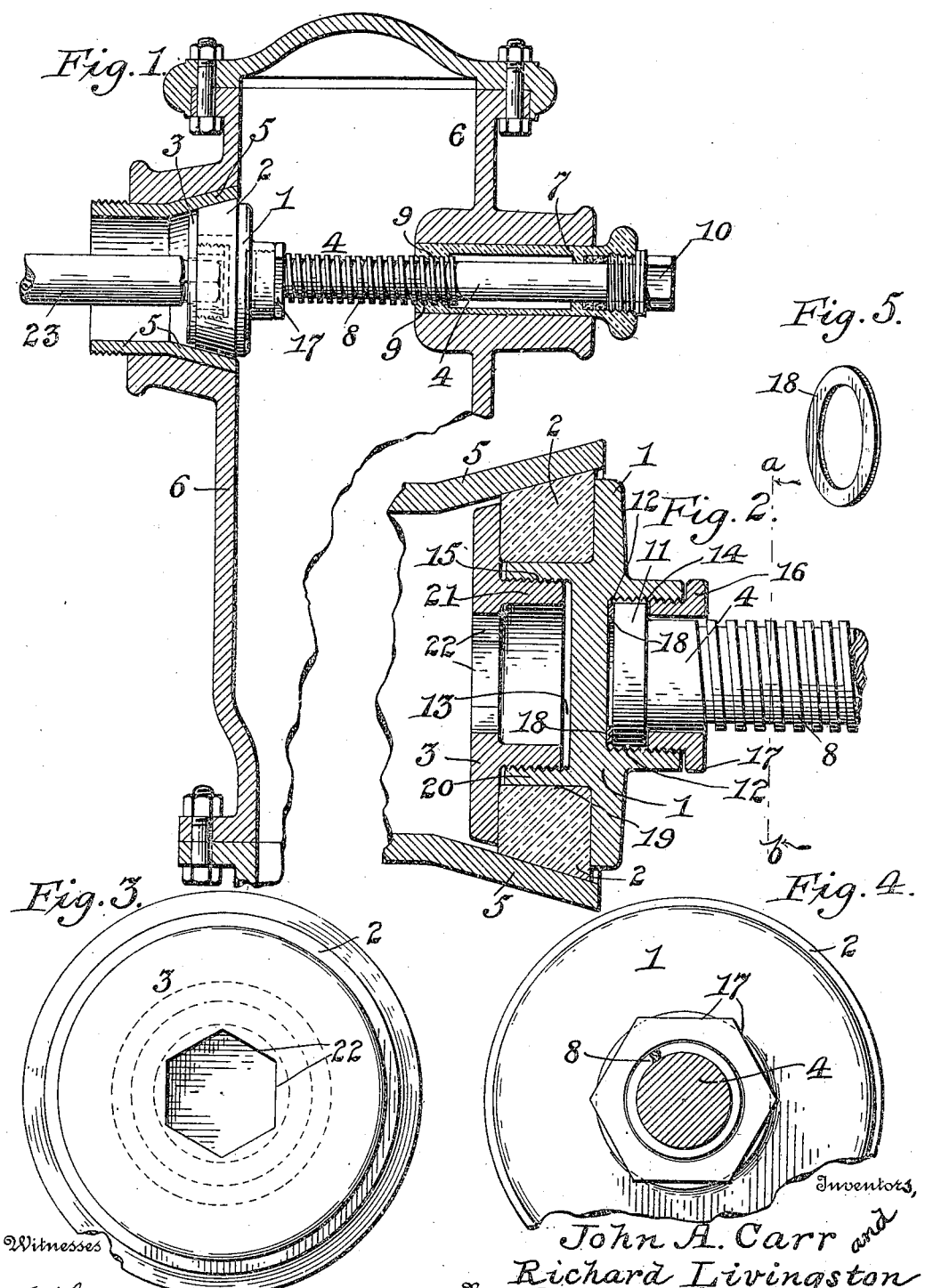

JOHN A. CARR AND RICHARD LIVINGSTON, OF LOS ANGELES, CALIFORNIA, ASSIGNORS TO KEYSTONE IRON WORKS, OF LOS ANGELES, CALIFORNIA, A CORPORATION OF CALIFORNIA.

VALVE.

953,370.	Specification of Letters Patent.	Patented Mar. 29, 1910.

Application filed March 24, 1909. Serial No. 485,421.

*To all whom it may concern:*

Be it known that we, JOHN A. CARR and RICHARD LIVINGSTON, citizens of the United States, residing at Los Angeles, in the county of Los Angeles and State of California, have invented certain new and useful Improvements in Valves, of which the following is a specification.

This invention relates to improvements in valves and particularly to that class of valves which is especially adapted for use in street or fire hydrants where a great outflowing pressure is exerted, especially when the suction of the modern powerful fire engine is applied to the hydrant.

It is the object of the invention to provide a valve for such a hydrant that will not only withstand the pressures brought to bear upon it in a street hydrant, but which shall have a strong connection with its operating valve stem and also which shall be accessible from the exterior of the hydrant for taking up any compression and wear upon the washer of the valve.

With these and other objects in view, the invention consists in certain novel constructions, combinations and arrangements of parts as will be hereinafter fully described and claimed.

In the accompanying drawing forming a part of this specification:—Figure 1 is a central vertical sectional view through a street or fire hydrant showing the improved valve of the present invention mounted therein. Fig. 2 is an enlarged detail sectional view through the said valve illustrating its formation. Fig. 3 is a view in elevation of the valve looking toward the outer face thereof. Fig. 4 is a detail sectional view taken upon the line *a—b* of Fig. 2 and looking toward the valve proper. Fig. 5 is a detail perspective view of the anti-friction ring employed between the valve stem and valve.

The valve of the present invention may be used in various places where the suction of liquids or other materials tends to help seat the valve but it is particularly adapted for use in street or fire hydrants where it must be unseated against tremendous pressure when water is to be drawn from the hydrant. As the valve is especially adapted for use in connection with such a hydrant, the drawings show the valve as applied to an improved form of fire hydrant, and the invention will be described, reference being had thereto.

In the said drawing 1 designates the body portion of the valve, 2 the packing washer, 3 the retaining nut plate therefor and 4 the valve stem. The valve is preferably operated in connection with a valve seat 5 which is mounted in an outlet opening formed in the hydrant casing 6. The said valve seat 5 is secured in the hydrant casing 6 in any desired manner and the valve stem 4 is mounted opposite to the valve seat in a bearing 7 also arranged in the hydrant casing 6. The valve stem 4 is arranged with its axis coinciding with the axis of the valve seat 5 and is made of suitable strength to pull the valve inwardly against the pressure of outflowing water. The said valve stem 4 is threaded at 8 for a portion of its length, the said threads engaging a correspondingly threaded portion 9 in the bearing 7, so that by turning the valve stem, it may be caused to reciprocate. The outer end of the valve stem extends outside the hydrant and is formed with a many sided head 10 to which a wrench may be applied for turning it. The inner end of the said stem 4 is formed with an annular flange 11 which movably engages the valve for moving the said valve back and forth.

The formation of the valve itself constitutes the most important part of the invention and will now be described. The body portion 1 is made of a diameter to approximately fill the valve seat 5, but does not touch the said seat. The said valve body portion 1 is formed with sockets 12 and 13 upon its opposite faces, both of which sockets are internally threaded as at 14 and 15. The socket 12 is made of suitable diameter to receive the flanged end 11 of the valve stem 4 and when it is inserted in said socket, the said valve stem is movably held therein by a ring nut 16, the threads of said nut engaging the threads 14 of the socket 12. The said ring nut 16 is formed with a many sided flange 17 to which a wrench may be applied for turning the said nut. A friction ring 18 is mounted between the end of valve stem 4 and the bottom of the socket 12. This ring is of great value and importance as it prevents the unscrewing of the body portion 1 from the nut 6 when the valve is being seated or unseated. The said ring 18 need not be made of great width and its insertion between the end of the valve stem and the body portion 1 of the valve, makes it possible to have the ring nut 16 screwed snugly to place so as to prevent any vibration of the valve upon the valve stem and yet the friction between the said valve stem and valve is so small that the said stem can be easily turned with respect to the valve for seating or unseating it and all tendency to separate the parts of the valve by unscrewing them, is prevented. Such unscrewing of the parts of the valve has been found to frequently occur when the ring 18 is not employed.

The washer portion 2 of the valve is preferably made of a substantial piece of rubber or like material of suitable thickness and is provided with a central opening 19 which fits snugly upon the socketed projection 20 of the body portion 1. The said washer 2 thus has a broad smooth bearing upon the body portion 1 and the projection 20 as clearly shown in Fig. 2 of the drawing. The said washer 2 is held in position on the body portion by means of a broad plate nut 3 which is formed with a projecting threaded portion 21 which is adapted to engage the threaded socket 13. The plate nut 3 is made of nearly the same diameter as the washer 2 to firmly hold the said washer against the body portion 1 of the valve and against any vibration or movement upon the same. The construction of the plate nut 3 also forms an important feature of the invention. The said plate nut is so formed and arranged that a very strong connection is afforded between it and the body portion of the valve, and it is so arranged that a wrench can be applied to it for tightening it and taking up any shrinkage, wear or compression of the rubber washer 2 and this may be taken up without the opening of the hydrant or removing the pressure of the water from the inner face of the valve. The strong connection between said plate nut and the body portion of the valve, is secured by the use of the projecting threaded portion 21 already referred to, and this is made of considerable diameter so that it is very strong and has a comparatively large threaded surface engaging the threaded socket 13 of the said body portion. The plate nut 3 is arranged on the outer face of the valve so as to be directly opposite the open end of the valve seat 5 of the hydrant. The central portion of the said plate nut 3 is open and a portion of it is many sided, being preferably made hexagonal in inner contour, as shown at 22. This affords a socket which can be engaged by the end of a socket wrench 23, as shown in Fig. 1. By turning said wrench of course, the said plate nut can be screwed tighter into place in the valve structure, and it will be evident that the valve need not be drawn inwardly or moved from its closed position for effecting this adjustment of the parts. This is a very important advantage secured by the construction of the valve forming the subject matter of the present invention.

When the hydrant is to be drawn upon for water, the valve stem 4 is turned until the valve is drawn inwardly and away from the valve seat 5. The water is thus permitted to rush past the valve and through the outlet orifice of the hydrant. Of course it will be seen that the valve has to be withdrawn from its seat against a strong water pressure and that it is subjected to such pressure to a great extent even after it has been withdrawn from said seat sufficiently to permit the water to flow out of the hydrant. It is found that no vibration of the valve upon its stem should be permitted, as it tends to loosen and separate the parts of the valve, especially when the powerful suction of modern fire engines is accelerating the flow of water from the hydrant beyond what would result from the usual pressure in the water mains. By the use of the frictional ring 18 as above described, the valve can be so snugly secured to the flanged end of the valve stem that there will be no play between parts and consequent vibration, and yet the valve stem can be turned with respect to the valve when seating and unseating the said valve. Altogether the structure of the valve and its connection with the valve stem, is not only simple but is possessed of great strength and durability and, in practice, is proving a very valuable valve for fire hydrants.

Having now described our invention what we claim as new and desire to secure by Letters Patent is:—

1. A valve comprising a body portion formed with a socket for receiving a valve stem, a valve stem engaging said socket, a ring nut for holding the valve stem movably in place and a friction ring interposed between the valve stem and the body portion of the valve and engaging the peripheral end edge of the said valve stem, permitting of the proper turning of the stem, but preventing any gyration of the valve thereon.

2. A valve comprising a body portion having sockets on opposite faces thereof, means for movably securing a valve stem in one of said sockets, a valve stem engaging said socket, a yielding washer surrounding the other socket and a plate nut engaging said latter socket for holding the said washer in place.

3. A valve comprising a body portion having oppositely extending socketed projections on its opposite faces, the sockets of said projections being internally threaded, a washer mounted on one of said socketed projections, a plate nut engaging its internal threads for holding said washer in place, a valve stem extending into the other socketed projection, a ring nut engaging its internal threads for movably holding the stem therein and a friction ring in said latter socketed projection, engaging the peripheral end edge of said stem for facilitating its turning without the chance of vibration.

4. A valve comprising a body portion having a hollow internally threaded projection extending from one of its faces, a washer fitting around said projection and a hollow plate nut for engaging said hollow projection and clamping the washer in place, the said plate nut having a wrench socket formed therein by which the nut may be tightened without disturbing the remainder of the valve structure.

5. A valve mechanism comprising a body portion having oppositely extending internally threaded hollow projections, a washer or packing ring mounted on one of said projections, a hollow plate nut engaging said projection and holding the said washer or packing in place, the said plate nut having a wrench receiving socket formed therein, a valve stem engaging the other projection on said body portion and having an annular flange formed upon its end, a ring nut engaging the hollow projection of the body portion and holding the valve stem movably in place and a friction ring interposed between the end of the said valve stem and the bottom of the hollow projection, for preventing an unscrewing of the parts of the valve when the stem is turned to seat and unseat the said valve.

6. A valve mechanism for street hydrants comprising a valve seat open at both ends, a valve for engaging said seat, made up of a body portion having a central socketed projection, a washer or packing ring mounted on said hollow projection, a washer nut adapted to engage the said socketed projection for holding the washer or packing in place, the washer nut having a socket formed therein for receiving a wrench, the socket being opposite the outer open end of the valve seat, so that it may be reached by wrench from a point outside the hydrant.

7. A valve mechanism for street hydrants comprising a valve seat mounted in the walls of the hydrant, a valve for engaging said seat comprising a body portion having oppositely projecting threaded sockets, a valve stem engaging one of said sockets and means for movably holding it therein, a washer or packing ring carried by the said body portion and surrounding the other threaded socket, a hollow nut plate engaging the latter threaded socket for holding the washer in place, the said hollow nut plate being easily reached from the exterior of the hydrant for tightening the parts of the valve without the necessity of unseating it.

In testimony whereof, we have hereunto set our hands, in presence of two witnesses.

JOHN A. CARR.
RICHARD LIVINGSTON.

Witnesses:
M. A. STEINMEYER,
A. M. HOWELL.